(12) United States Patent
Krzyzanowski et al.

(10) Patent No.: US 9,288,080 B2
(45) Date of Patent: Mar. 15, 2016

(54) NETWORK-EXTENSIBLE AND CONTROLLABLE TELEPHONE

(75) Inventors: Paul Krzyzanowski, Flemington, NJ (US); Michael Kelly, Deerfield Beach, FL (US); Ronald Hume, Tamarac, FL (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/580,885

(22) Filed: Oct. 16, 2009

(65) Prior Publication Data

US 2010/0178876 A1 Jul. 15, 2010

Related U.S. Application Data

(63) Continuation of application No. 11/359,462, filed on Feb. 23, 2006, now abandoned.

(60) Provisional application No. 60/659,253, filed on Mar. 8, 2005.

(51) Int. Cl.
*H04B 7/00* (2006.01)
*H04M 3/42* (2006.01)
*G06F 15/177* (2006.01)
*H04L 12/66* (2006.01)
*H04M 7/12* (2006.01)
*H04B 7/14* (2006.01)
*H04L 12/12* (2006.01)

(52) U.S. Cl.
CPC ....... *H04L 12/66* (2013.01); *H04B 7/14* (2013.01); *H04L 12/12* (2013.01); *H04M 3/42127* (2013.01); *H04M 3/42136* (2013.01); *H04M 7/1275* (2013.01)

(58) Field of Classification Search
CPC .......... H04B 7/14; H04L 12/12; H04L 12/66; H04M 3/42127; H04M 3/42136; H04M 7/1275
USPC .......................................................... 370/352
See application file for complete search history.

(56) References Cited

U.S. PATENT DOCUMENTS 6,014,711 A * 1/2000 Brown .......................... 709/245
6,161,134 A * 12/2000 Wang et al. ................... 709/220
6,725,281 B1 * 4/2004 Zintel et al. ................... 719/318

(Continued)

FOREIGN PATENT DOCUMENTS

CA 2594924 A1 9/2006
CN 1426202 A 6/2003

(Continued)

OTHER PUBLICATIONS

Supplementary International Search Report issued in EP Appl. No. 067373522 on Apr. 20, 2010, 6 pgs.

(Continued)

*Primary Examiner* — Alpus H Hsu
(74) *Attorney, Agent, or Firm* — Aaron Chatterjee; Micky Minhas

(57) ABSTRACT

A system that includes a telephone adapted for connection to a data communications network. The telephone is capable of discovering other devices connected to the data communications network and using those devices to extend its own functionality. The telephone is also accessible and controllable by other devices on the data communications network.

12 Claims, 5 Drawing Sheets

(56) References Cited

U.S. PATENT DOCUMENTS

| | | | |
|---|---|---|---|
| 7,076,048 B2 * | 7/2006 | Lee et al. | 379/265.01 |
| 7,356,629 B2 * | 4/2008 | Killermann | 710/105 |
| 7,480,723 B2 * | 1/2009 | Grabelsky et al. | 709/228 |
| 7,522,931 B2 * | 4/2009 | Ranalli et al. | 455/518 |
| 7,697,506 B2 * | 4/2010 | Narin et al. | 370/352 |
| 7,852,831 B2 * | 12/2010 | Akbar | 370/352 |
| 8,818,338 B2 * | 8/2014 | Gidron | G06Q 30/06 370/229 |
| 2002/0029256 A1 * | 3/2002 | Zintel et al. | 709/218 |
| 2002/0035621 A1 * | 3/2002 | Zintel et al. | 709/220 |
| 2003/0120840 A1 | 6/2003 | Isozu | |
| 2004/0109446 A1 | 6/2004 | Heo | |
| 2004/0128344 A1 | 7/2004 | Trossen | |
| 2004/0221088 A1 | 11/2004 | Lisitsa et al. | |
| 2004/0233904 A1 | 11/2004 | Saint-Hilaire et al. | |
| 2005/0018687 A1 | 1/2005 | Cutler | |
| 2005/0076150 A1 | 4/2005 | Lee et al. | |
| 2005/0240680 A1 | 10/2005 | Costa-Requena et al. | |
| 2005/0266879 A1 | 12/2005 | Spaur et al. | |
| 2005/0267935 A1 * | 12/2005 | Gandhi et al. | 709/203 |
| 2005/0282590 A1 | 12/2005 | Haparnas | |
| 2006/0031510 A1 * | 2/2006 | Beck | H04L 12/585 709/226 |
| 2006/0100815 A1 | 5/2006 | Wheeler et al. | |
| 2006/0128364 A1 | 6/2006 | Costa-Requena et al. | |
| 2006/0133414 A1 * | 6/2006 | Luoma et al. | 370/466 |
| 2006/0143295 A1 | 6/2006 | Costa-Requena et al. | |
| 2006/0143314 A1 * | 6/2006 | Sinha et al. | 710/5 |
| 2006/0168656 A1 * | 7/2006 | Stirbu | 726/15 |
| 2006/0177025 A1 * | 8/2006 | Frifeldt | H04L 12/58 379/88.22 |
| 2006/0193451 A1 * | 8/2006 | Sharma | H04M 3/42093 379/88.16 |
| 2006/0198448 A1 * | 9/2006 | Aissi et al. | 375/259 |
| 2006/0209810 A1 | 9/2006 | Krzyzanowski et al. | |
| 2006/0291434 A1 | 12/2006 | Gu et al. | |

FOREIGN PATENT DOCUMENTS

| | | |
|---|---|---|
| CN | 1484414 A | 3/2004 |
| CN | 101120558 | 2/2008 |
| EP | 1856866 | 11/2007 |
| KR | 20070110336 A | 11/2008 |
| WO | WO 2006/009745 A2 | 9/2006 |

OTHER PUBLICATIONS

Non Final Office Action for U.S. Appl. No. 11/359,462, mailed Nov. 25, 2008, 17 pgs.
Final Office Action for U.S. Appl. No. 11/359,462, mailed Apr. 15, 2009, 21 pgs.
International Search Report and Written Opinion issued in International Appl. No. PCT/US06/08171 on Aug. 25, 2006, 6 pgs.
English language abstract of CN 101120558, 1 pg.
English language abstract of JP 2008533823, published Aug. 21, 2008, 1 pg.
English language abstract of KR 20070110336, 1 pg.
English language translation of Chinese Office Action, Chinese Patent Appln. No. 200680004907.9, filed Mar. 8, 2006, issued Dec. 4, 2009, 10 pgs.
English-Language Abstract for CN 1484414A, published Mar. 24, 2004; 1 page.
English-Language Translation of Notification of the Second Office Action directed to related Chinese Application No. 200680004907.9, mailed Mar. 31, 2011, from the State Intellectual Property Office of the People's Republic of China; 5 pages.
Office Action received for Canadian Patent Application No. 2594924 mailed on Jul. 29, 2013, 4 pages.
Notice of Reexamination Received for China Patent Application No. 200680004907.9, Mail Date: May 29, 2014, File Date: Mar. 8, 2006, 10 Pages.
Office Action received for Canadian Patent Application No. 2,594,924, Mail Date: Jul. 24, 2014, 6 Pages.
Third Office Action Received for China Patent Application No. 200680004907.9, Mail Date: May 6, 2015, 15 Pages.

* cited by examiner

US 9,288,080 B2

NETWORK-EXTENSIBLE AND CONTROLLABLE TELEPHONE

CROSS REFERENCE TO RELATED APPLICATIONS

This application is a continuation of U.S. application Ser. No. 11/359,462, filed Feb. 23, 2006 (abandoned), which claims the benefit under 35 U.S.C. §119(e) to U.S. Provisional Patent Application No. 60/659,253, filed Mar. 8, 2005, which are both incorporated by reference herein in their entireties.

BACKGROUND OF THE INVENTION

1. Field of the Invention

The present invention is generally directed to telephones. In particular, the present invention is related to telephones capable of communicating over a data network.

2. Background Art

A recent trend in devices connected to a data communications network is to make such devices discoverable on the network, have them expose network services, and allow other nodes on the network to request these services. Protocols such as Universal Plug and Play (UPnP™), Jini™, and Salutation™ provide mechanisms for one device to discover the presence of a particular device (or class of device) on the network and invoke services upon it. Another related protocol, Rendezvous™ (networking technology offered by Apple Computer Inc. of Cupertino, Calif.), provides a way for services to register themselves and be discovered, although the actual protocol for service invocation must be known to both communicating parties.

Many network devices use a subset of these discovery protocols to support the use of low-level "automatic configuration" protocols. Both UPnP™ and Apple's Rendezvous™, for example, support a "zero configuration" (zeroconf) protocol known as AutoIP to assign Internet Protocol (IP) addresses even if a Dynamic Host Configuration Protocol (DHCP) server is not present.

A device that implements UPnP™ can configure itself on the network, broadcast an announcement of its existence, allow UPnP™ control points (other nodes) to query its functional interface, allow others to access a web site that it is hosting, and allow others to invoke functions on that device. A UPnP™ control point can receive announcements of UPnP™ devices on the network, can query for devices of a particular type or with particular attributes, can query an individual device for its interface, and can invoke functions on that device.

BRIEF SUMMARY OF THE INVENTION

A telephone in accordance with the present invention is adapted for connection to a data network. In an embodiment, the telephone includes logic that enables it to discover other devices connected to the data network and use those devices to extend its own functionality. In a further embodiment, the telephone is also accessible and controllable by other devices in the data network.

For example, a system in accordance with an embodiment of the present invention includes a data communication network, a device communicatively connected to the data communication network, and a telephone communicatively connected to the data communication network. The telephone is adapted to discover the device, to invoke a first service provided by the device, and to use the first service to provide a second service to a user of the telephone.

A method for operating a telephone communicatively connected to a data network in accordance with an embodiment of the present invention includes discovering a device communicatively connected to the data communication network, invoking a first service provided by the device, and using the first service to provide a second service to a user of the telephone.

As another example, a system in accordance with an embodiment of the present invention includes a data communication network, one or more devices communicatively connected to the data communication network, and a telephone communicatively connected to the data communication network. The telephone is adapted to advertise a service provided by the telephone to the one or more devices communicatively connected to the data communication network, and to provide the service to one of the one or more devices in response to receiving a request for the service.

A method for operating a telephone communicatively connected to a data network in accordance with an embodiment of the present invention includes advertising a service provided by the telephone to one or more devices communicatively connected to the data communication network, receiving a request for the service from one of the one or more devices, and providing the service to the one of the one or more devices in response to receiving the request.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
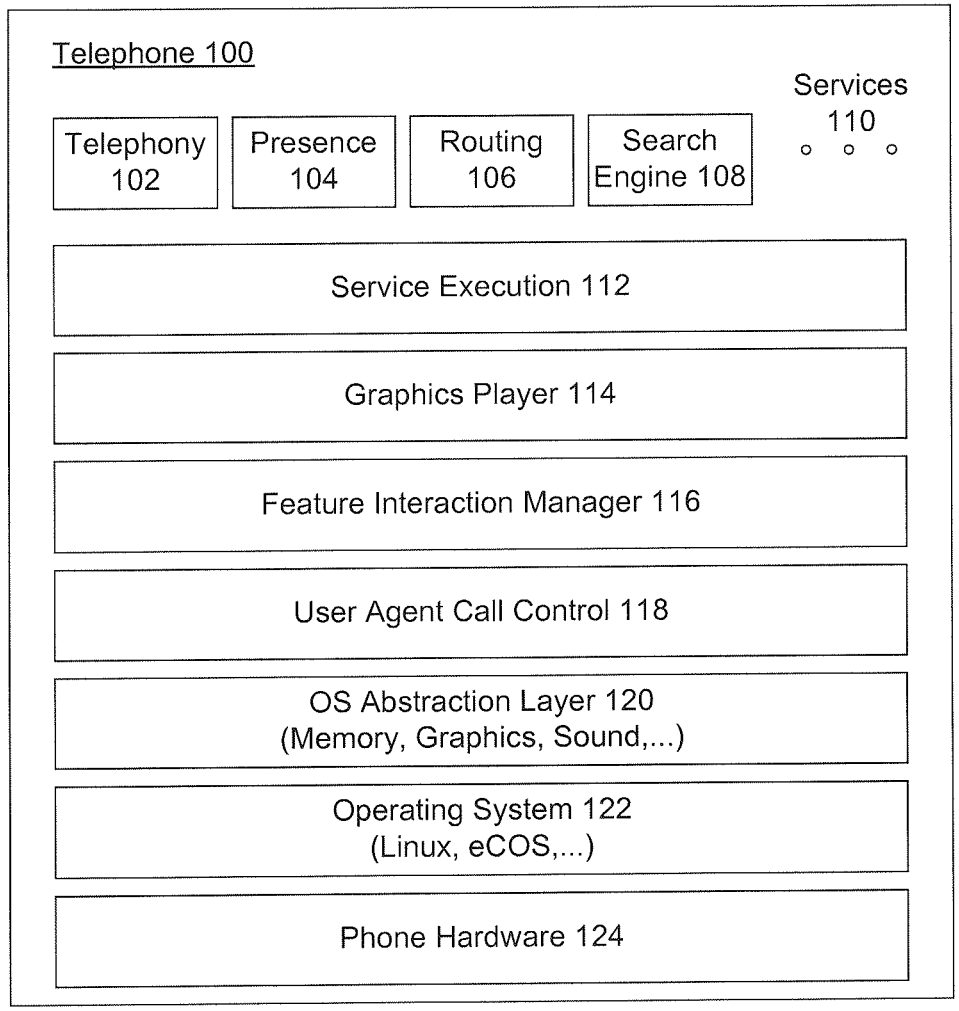
FIG. 1 is a block diagram of a system architecture of a telephone in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

The present invention is directed to a telephone adapted for connection to a data network. In accordance with one embodiment of the present invention, the telephone can discover other devices on the network that it can then interact with to allow it to enhance its own feature set. In accordance with a further embodiment of the present invention, devices on the data network, such as a personal computer (PC), can discover and control the telephone.

In accordance with an example implementation of the present invention described in more detail herein, the telephone serves as both a UPnP™ device and a UPnP™ control point. As such, the description that follows refers to the UPnP™ protocol. However, the present invention is not limited to use with that particular protocol, and may be used with other discovery and web services protocols, included but not limited to Jini™, Salutation™, Rendezvous™ and .Net web services. Additionally, an embodiment of the present invention may use an automatic configuration protocol such as AutoIP.

A. NETWORK EXTENSIBLE TELEPHONE IN ACCORDANCE WITH AN EMBODIMENT OF THE PRESENT INVENTION

In accordance with an embodiment of the present invention, a telephone can discover other devices on a data network to which it is communicatively connected. The devices can allow it to enhance its own feature set. In the UPnP™ sense, the telephone acts as a control point. The "devices" need not be physical devices but can be network services provided by a server or devices that advertise the ability to perform one or more functions. For example, a PC can advertise itself as an audio/video output device and accept audio and video streams that it will render as it sees fit. This is just a subset of the PC's functionality.

Some examples of devices that can be discovered by the telephone and the manner in which each device can be used by the telephone to extend its own functionality are set forth below:

(a) In one embodiment of the present invention, the telephone can discover a directory server that can be used as a dialing directory on the telephone. If the directory server maintains a user's presence status, the telephone may register itself with the server to receive an event whenever any presence status gets modified.

(b) In another embodiment of the present invention, the telephone can discover an audio output device (e.g., a network speaker). The audio output device can be used to create a speakerphone. Discovering several audio output devices can allow the telephone to multicast audio to all selected output devices or allow the user to choose a specific audio output.

(c) In a further embodiment of the present invention, the telephone can discover an audio input device (e.g., a network microphone). The audio input device can be used as a remote microphone. Together with the audio output device, the telephone can now act as a conference phone.

(d) In an additional embodiment of the present invention, the telephone can discover a video output device (e.g., a TV, Digital Media Adapter, or PC) that supports UPnP™ Audio/Visual (AV). The telephone can now be used to receive video broadcasts.

(e) In another embodiment of the present invention, the telephone can discover a video input device (e.g., a network camera or a WebCam on a PC). By also implementing the functionality described in paragraphs (b), (c), and (d), above, the telephone can now become a videoconferencing telephone.

(f) In a further embodiment of the present invention, the user may allow the telephone to update its own display to a specific video output device. This can allow a view of the telephone's display on a PC.

(g) In an additional embodiment of the present invention, the user may allow the telephone to send its ring to a specific audio output device. This can allow the ring to be directed to a PC's speakers (or other network speakers).

(h) In a still further embodiment of the present invention, the telephone may discover an authentication server and authenticate the user making calls (via, for example, a personal identification number (PIN) entered on the keypad or a biometric identification).

Note that the foregoing are only a few examples of how a telephone in accordance with the present invention can communicate and interact with external network devices. These examples are not intended to limit the present invention.

B. A NETWORK DISCOVERABLE AND CONTROLLED TELEPHONE IN ACCORDANCE WITH AN EMBODIMENT OF THE PRESENT INVENTION

In another embodiment of the present invention, devices on the network, such as a PC, can discover one or more telephones that are also on the network. An example telephone comprises a conglomerate of several functional components, such as a speaker (audio output), microphone (audio in), display (video output), user-interface controls (keypad, on-hook/off-hook controls, DTMF generation), user-interface status indicators (LEDs), signaling information (on-hook, off-hook, busy, ringing, ANI/caller-ID), and signaling control (take phone off-hook, hang-up, set up a call). In the UPnP™ sense, the telephone acts as a UPnP™ device, advertising its capabilities. This can enhance the ways in which a user interacts with the telephone.

Some examples of functionality afforded by this mode of operation are set forth below:

(a) In one embodiment, a PC on the data network obtains user interface and signaling information from the telephone to provide a user interface on the PC that reflects the telephone's state.

(b) In another embodiment, a PC on the data network provides "click-to-dial" service. In accordance with this embodiment, the PC will establish a call via the telephone. The user will then interact with only the telephone for the duration of the call, with the PC being out of the picture (unless other capabilities are mixed in, such as using the PC's speakers or having a program, say, force a call disconnect after 10 minutes of conversation). In accordance with the present invention, this functionality can be implemented easily and in a non-customized manner.

(c) In a further embodiment, more complex telephony functions are facilitated, such as call transfer or conferencing, to provide ease of use. In accordance with this embodiment, a PC on the data network can provide an interface that will send the appropriate commands to the telephone. A list of conferenced parties may be maintained on the PC, allowing easy disconnects and additions.

(d) In an additional embodiment, stored audio may be directed to the telephone from a PC on the data network. For example, the user may be on a call and wish to describe a product. The user can drag-and-drop a previously created audio file that's resident on the PC to a phone icon. That will direct the audio to the currently active call.

(e) In a still further embodiment, a PC on the data network may receive an audio stream from the telephone to record a conversation.

(f) In another embodiment, advanced call control features can be built as applications which are executed on a PC on the data network. For example, in accordance with this embodiment, one can implement a "redial while busy" feature that establishes a call via the telephone and then checks its status, hanging up and reestablishing the call if needed.

(g) In a further embodiment, a PC on the data network can be notified of "events" that include incoming calls to the telephone. In response to an incoming call, the PC can look up the ANI string (automatic number identification, or caller ID) in a database. The result of that lookup can, for example, generate a custom ring tone or pop an alert window on the PC (or suppress the ring for unwanted calls).

(h) In an additional embodiment, a two-way wireless communication device (e.g., a WiFi PDA) on the data network can act as a surrogate for the telephone, displaying the status of the telephone and routing audio and signaling between the device and the telephone.

(i) In a still further embodiment, a home control system on the data network can register to receive events such as incoming calls to the telephone. The home control system can then, for example, mute the TV™ when a telephone is picked up or when the telephone is ringing.

(j) In another embodiment, a PC on the data network can send alerts generated in response to the receipt of new e-mail or instant messages to the telephone's display or light up a message waiting light as an alert.

(k) In a further embodiment, the telephone can serve as a UPnP™ audio device, playing a stream of music sent from a media server on the data network.

(l) In an additional embodiment, the telephone can serve as a UPnP™ video device, showing a slideshow or videos from a media server on the data network.

(m) In a still further embodiment, Internet radio/video/pictures could be directed to the telephone from a device on the data network.

(n) In another embodiment, a PBX system (e.g., a SIP proxy, PC running Asterisk, or an IP-enhanced traditional key system) can automatically discover phones on the data network and configure them, thus simplifying the setup of a multi-phone system.

C. EXAMPLE TELEPHONE ARCHITECTURE AND DATA NETWORK IMPLEMENTATIONS IN ACCORDANCE WITH EMBODIMENTS OF THE PRESENT INVENTION

The invention is further explained by way of the following examples with reference to the accompanying drawings.

FIG. 1 is a block diagram of a system architecture of a telephone 100 in accordance with an embodiment of the present invention. As shown in FIG. 1, telephone 100 includes phone hardware 124, an operating system 122 (such as Linux or eCOS), a user agent call control 118, a feature interaction manager 116, a graphics player 114 (such as the Tango™ vector-graphics player developed and licensed by OpenPeak Inc., of Boca Raton, Fla.), a service execution environment 112 and a set of services 110, including telephony 102, presence 104, routing 106, and search engine 108 (e.g., Yahoo!®). The base layer of the architecture is an operating system abstraction layer 120 that interfaces to underlying operating system 122, providing the higher layers of software with core capabilities such as semaphores, memory management, threads, messages, and a debugging framework. This provides a consistent application programming environment that facilitates porting to different operating systems.

Telephone 100 of FIG. 1 includes a UPnP™ stack to allow the device to announce its existence and its services on a data network and to discover other devices and services on the data network.

The telephone architecture also contains the following components:

User agent call control 118: An underlying multimedia session control module. This component manages the lifecycle of media streams including creation, stream properties (i.e., codec, multi-party, transfer, etc), and destruction;

Feature interaction manager 116: An arbitration layer which allows for the ad-hoc creation of services by enabling the combination of existing plug-in services and allowing them to interact in useful ways (e.g., share streaming content from an application with someone at other end of phone conversation);

Service Execution Environment 112: A services toolkit and service enabling environment for third-party value added applications. Allows the use of well known industry standard content authoring tools to provide advanced capabilities to the end-user;

Graphics Player 114: A vector-graphics based graphical user interface (GUI) and programming system that runs the user interface and provides an architecture where extended interfaces can be plugged in (e.g., access news headlines, run a screen saver); and Plug-in services 110: These are value-added services.

Figure 2:
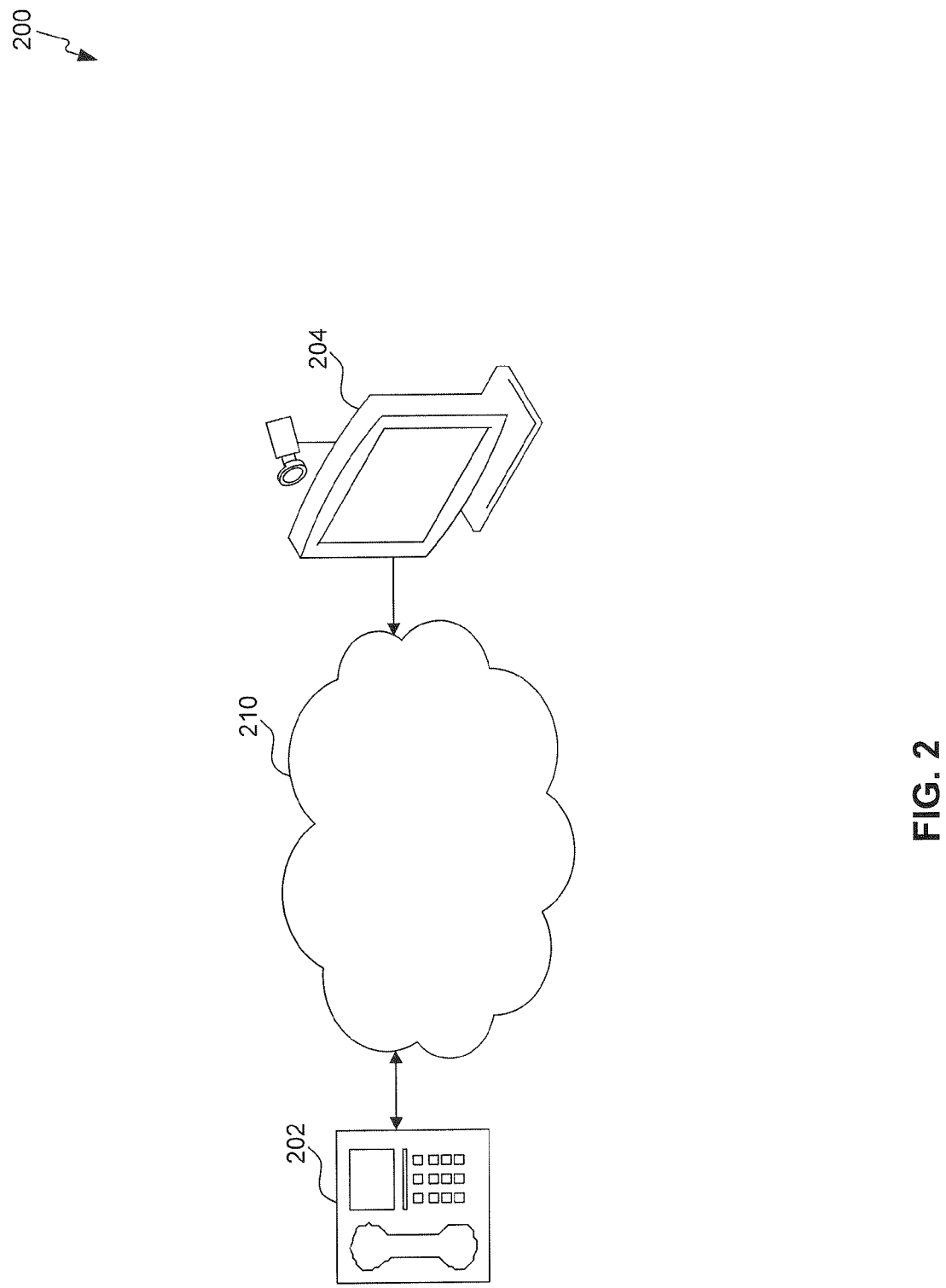
FIG. 2 is an illustration showing a telephone in accordance with an embodiment of the present invention discovering and using network devices and services.

FIG. 2 illustrates a system 200 that includes a telephone 202 in accordance with an embodiment of the invention that is capable of discovering and using network devices and services on a data network 210. An embodiment of the invention facilitates easy enhancement of the telephone with peripherals. For example, telephone 202 can discover UPnP™ speakers and use those speakers for a speakerphone, or discover a display to use as a destination for videoconferencing applications. Other devices that can be discovered and used by telephone include a video camera or a microphone, however these examples are not intended to be limiting. For example, as shown in FIG. 2, telephone 202 can discover an integrated display and video camera 204, receive video content from the camera and send video content to the display.

Figure 3:
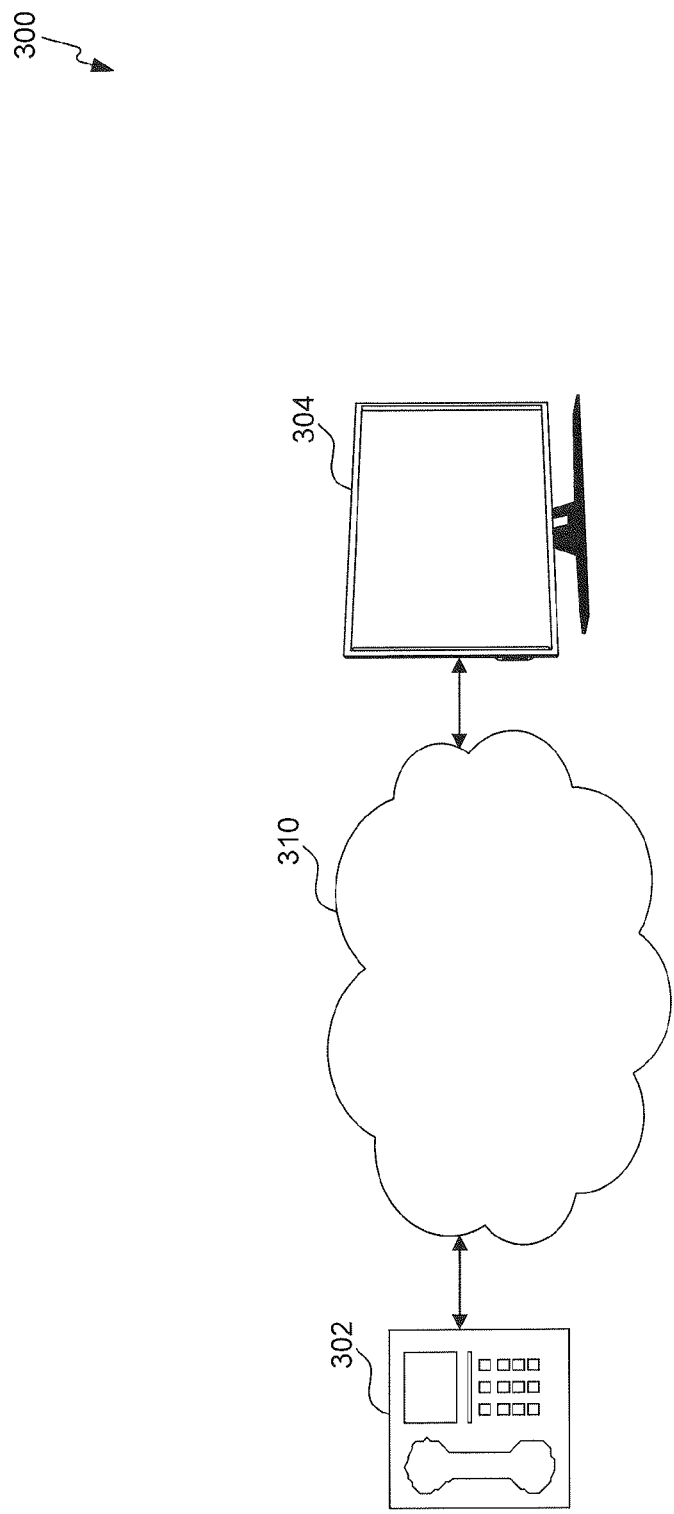
FIG. 3 is an illustration showing network systems discovering a telephone in accordance with an embodiment of the present invention.

FIG. 3 is an illustration of a network environment 300 in which network systems discover a telephone 302 on a data network 310 in accordance with an embodiment of the invention. For example, a computer 304 can discover telephone 302 in accordance with the invention. This enables services such as click-to-dial, using the computer to help with tasks like conferencing and call forwarding, or sending instant message (IM) notifications to the telephone screen. This also allows for a standards-based way of writing software that interacts with the telephone.

Figure 4:
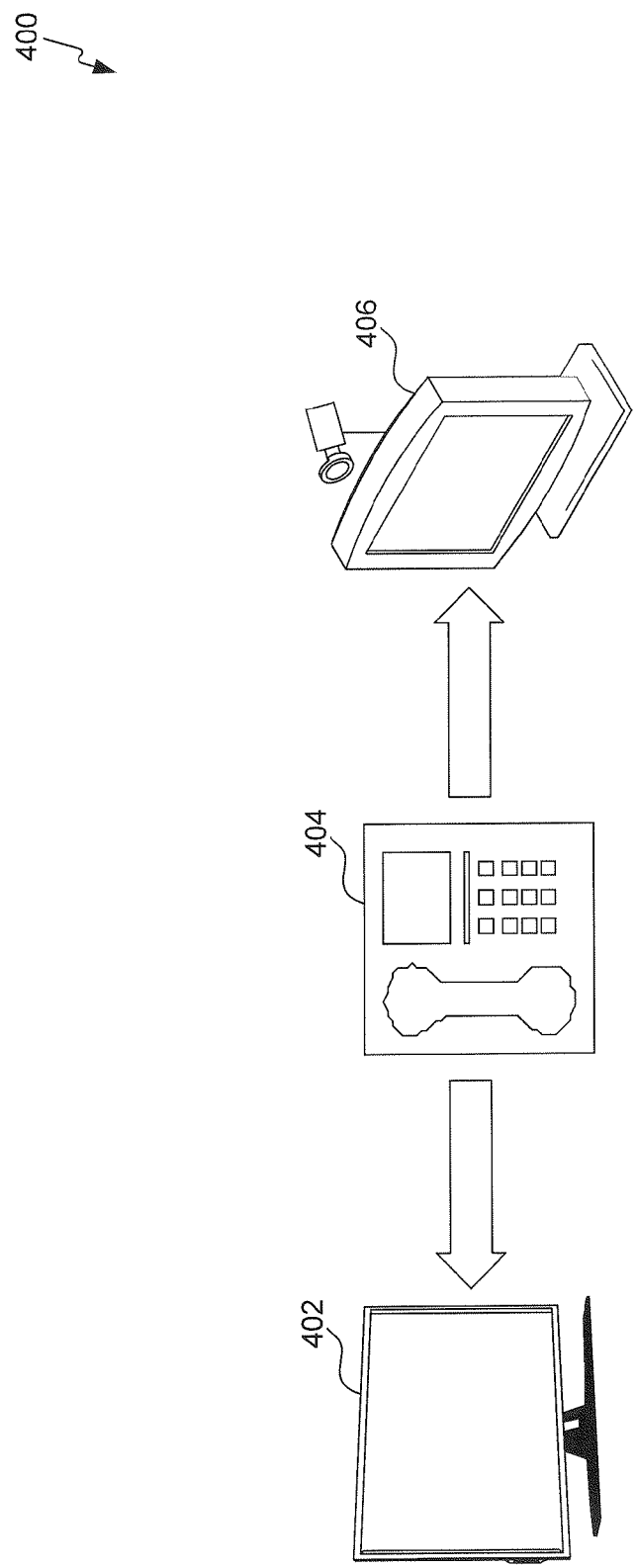
FIG. 4 is an illustration of a telephone-centric "ecosystem" in accordance with an embodiment of the present invention.

FIG. 4 is an illustration of a telephone-centric "ecosystem" 400 according to an embodiment of the present invention. The telephone 404 of this embodiment, which is both visible on the network and discovers components on the network, becomes the heart of an ad hoc ecosystem that is assembled for a specific application (e.g., videoconferencing will require the assembly of a telephone, a microphone, a display, a speaker, and a camera). In FIG. 4, telephone 402 is shown in communication with a first display 402, which may be used to display the desktop or applications miming on a personal computer (PC), and a second display 406 that includes an integrated video camera and may be used for receiving and displaying video content associated with a video teleconference. In this embodiment, first display 402 and second display 406 essentially act as peripherals to telephone 402 to provide an enhanced telephone experience for the user.

Figure 5:
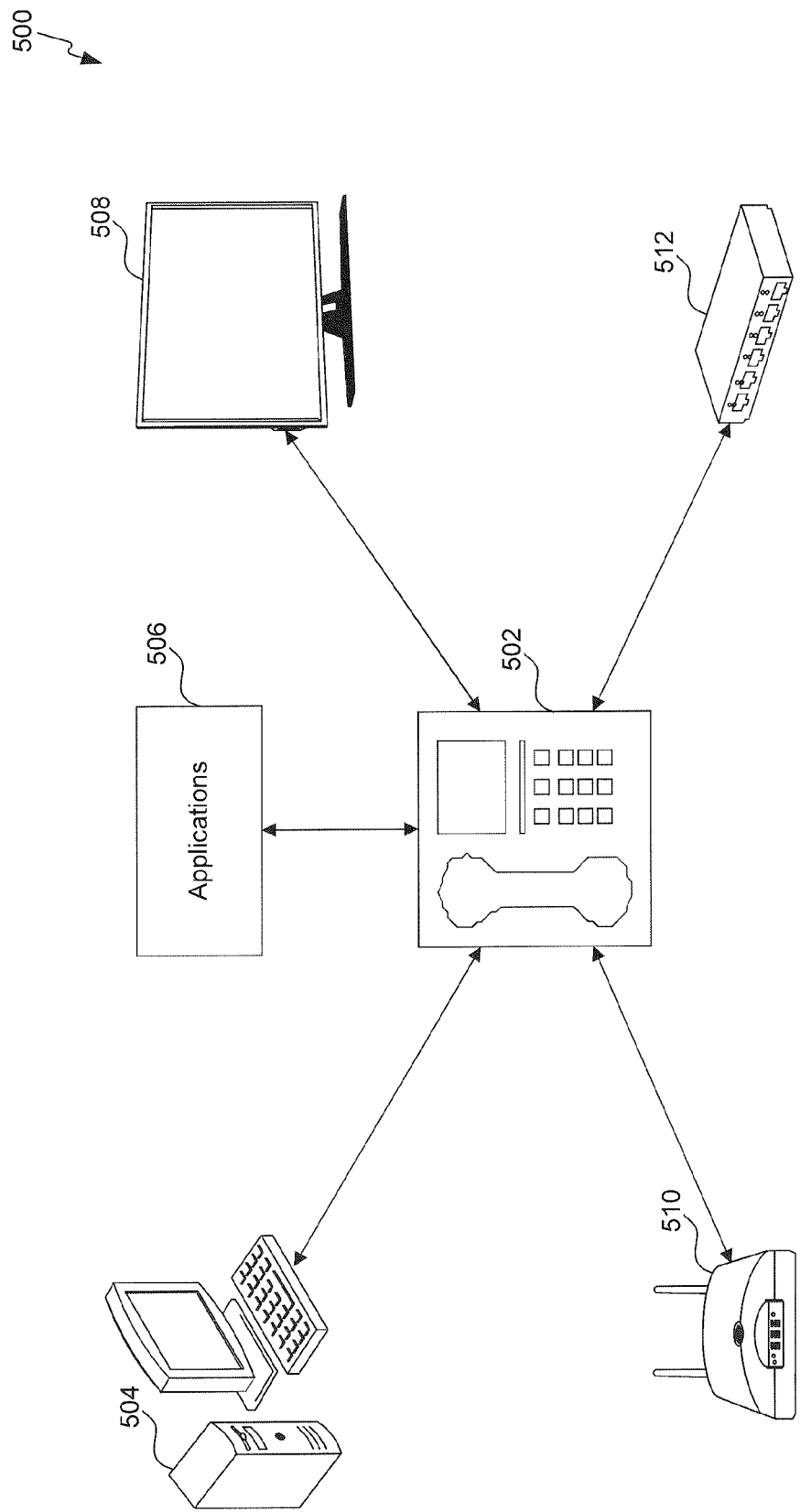
FIG. 5 is an illustration of an exemplary deployment of a telephone in accordance with an embodiment of the present invention in relation to other devices/services in a network.

FIG. 5 is an illustration of an exemplary deployment 500 of a telephone 502 in accordance with an embodiment of the present invention in relation to other devices/services in a network. As shown in FIG. 5, telephone 502 is capable of discovering and utilizing devices such as a PC 504, a digital TV (DTV) 508, a router 510, and a IP-PBX 512. Telephone 502 is also capable of accessing certain applications 506, including stored data and/or web-based services (e.g., directory information, audio, video, etc.). In deployment 500, telephone 502 acts as a control hub of a system of networked devices that can provide enhanced functionality to the user using telephone 502. For example, the user can view a list of voice messages stored on IP-PBX 512 either on a built-in screen of telephone 502 or on the larger display of DTV 508. In another example, when the user places a call on hold, telephone 502 can access digital music stored on PC 504 (or access such content online), and play songs for the caller through IP-PBX 512 and router 510 while the caller waits on hold. Thus, by accessing and utilizing these and other networked devices, telephone 502 can expand its functionality and significantly enhance the user's experience.

D. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A telephone that serves as both a network-extensible device and a control point, comprising:
    a processor; and
    a memory having stored thereon an operating system and logic that enables the telephone to discover other devices being communicatively connected to a network and to extend its own telephony functionality using one or more of the other devices, the logic configuring the telephone to extend its own telephony functionality at least by
    configuring the telephone to discover a directory server that maintains a presence status for a plurality of users and is used as a dialing directory on the telephone,
    configuring the telephone to register with the directory server, and
    configuring the telephone to receive an event when the directory server modifies a presence status associated with one of the plurality of users.

2. The telephone of claim 1, wherein the logic enables the telephone to extend its own telephony functionality further by configuring the telephone to discover one or more of an audio output device to be used to create a speakerphone or an audio input device to be used as a remote microphone.

3. The telephone of claim 1, wherein the logic enables the telephone to extend its own telephony functionality further by configuring the telephone to discover one or more of a video output device or a video input device.

4. The telephone of claim 1, wherein the logic enables the telephone to extend its own telephony functionality further by configuring the telephone to update its own display to a specific video output device.

5. The telephone of claim 1, wherein the logic enables the telephone to extend its own telephony functionality further by configuring the telephone to send its ring to a separate audio output device.

6. The telephone of claim 1, wherein the logic enables the telephone to extend its own telephony functionality further by configuring the telephone to discover an authentication server and to authenticate a user of the telephone.

7. A method for operating a telephone that serves as both a network-extensible device and a control point, comprising
    discovering one or more devices communicatively connected to a data communication network using the telephone; and
    extending a telephony functionality of the telephone using the discovered one or more devices, the discovered one or more devices comprising a directory server that maintains a presence status for a plurality of users and is used as a dialing directory on the telephone, and extending the telephony functionality of the telephone comprising at least
    registering the telephone with the directory server, and
    receiving an event when the directory server modifies a presence status associated with one of the plurality of users.

8. The method of claim 7, wherein extending the telephony functionality of the telephone further comprises configuring the telephone to discover one or more of an audio output device to be used to create a speakerphone or an audio input device to be used as a remote microphone.

9. The method of claim 7, extending the telephony functionality of the telephone further comprises configuring the telephone to discover one or more of a video output device or a video input device.

10. The method of claim 7, wherein extending the telephony functionality of the telephone further comprises configuring the telephone to update its own display to a specific video output device.

11. The method of claim 7, wherein extending the telephony functionality of the telephone further comprises configuring the telephone to send its ring to a separate audio output device.

12. The method of claim 7, wherein extending the telephony functionality of the telephone further comprises configuring the telephone to discover an authentication server and to authenticate a user of the telephone.

* * * * *